Patented Sept. 15, 1936

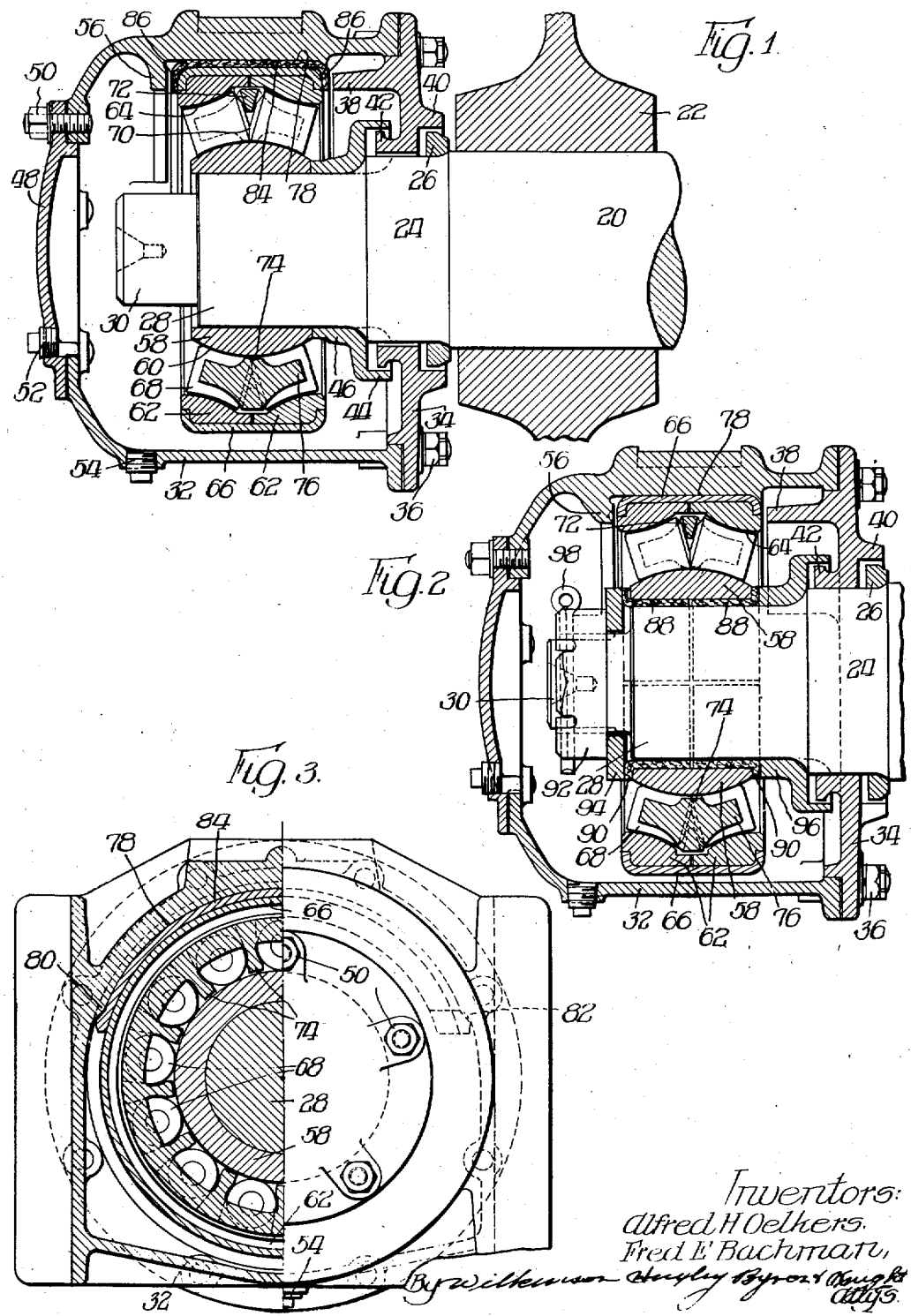

2,054,228

UNITED STATES PATENT OFFICE 2,054,228

WHEEL AND AXLE ASSEMBLY

Alfred H. Oelkers and Fred E. Bachman, Chicago, Ill., assignors to American Steel Foundries, Chicago, Ill., a corporation of New Jersey Application March 6, 1933, Serial No. 659,660

16 Claims. (Cl. 308—180)

This invention relates to wheel and axle assemblies for railway rolling stock and more particularly to the provision of a roller bearing assembly through which the journal box is mounted on the axle.

There has been disclosed in the application of Bachman, Serial No. 512,805, filed February 2, 1931, a roller bearing assembly through which the journal box is supported upon the axle, the bearing being of a type to take both vertical load and end thrust and self-aligning to accommodate any axle deflection that may occur.

In railway cars driven by electric motors, the current is frequently taken from the motor windings through the wheels and axles to the rails. When the weight of the car is carried on the roller bearing, damage frequently results from the passage of electrical current through the rollers of the bearing.

It is an object of the present invention to provide car axles, especially axles of cars driven by electric motors, with roller bearing assemblies, the journal box and bearing assembly being of such construction that the journal box may oscillate with respect to the axle and may have a limited amount of lateral movement with respect to the axle.

It is further an object of the present invention to provide a journal box mounting for roller bearings having insulating material for preventing passage of electric currents through the roller bearing assembly.

It is further an object of the present invention to provide anti-friction material associated with a roller bearing assembly in such a manner that upon failure of the roller bearing, the axle may continue its rotation with respect to the journal box, the anti-friction providing an emergency bearing.

With these and various other objects in view, the invention may consist of certain novel features of construction and operation as will be more fully described and particularly pointed out in the specification, drawing and claims appended hereto.

In the drawing:

Figure 1 is a fragmentary sectional elevation through a wheel and axle assembly;

Figure 2 is a view similar to Figure 1 but showing a modication thereof; and

Figure 3 is an end elevation of the structure shown in Figure 1, the left-hand half being shown in section.

Referring to both forms of the structure as disclosed in Figures 1 and 2, the rotatable axle 20 has fixedly mounted thereon a wheel 22. A slightly reduced portion 24 of the axle has mounted thereon a deflector ring or collar 26. The axle has a further reduced portion constituting a journal bearing 28 and a reduced end portion 30. The axle fits into a journal box 32 adapted to be mounted in the side frame of a truck.

The journal box has an inner closure 34 secured by bolts 36, and provided with an arcuate flange 38 inwardly directed with respect to the journal box at the top portion thereof. The closure 34 is further provided with an annular flange 40 extending over the collar 26 and an inwardly directed annular flange 42 overlapped by the cylindrical flange 44 of a deflector collar 46 mounted on the bearing portion 28 of the axle. The journal box has an outer closure member 48 fastened by bolts 50. Lubricant may be introduced into the journal box through an opening closed by a plug 52 and may be drained by removal of plug 54. The journal box is provided with an arcuate stop flange 56 which, in cooperation with the flange 38, serves to restrict lateral displacement of the bearing assembly, as will be later described.

The bearing assembly is self-aligning to compensate for oscillation between the axle and journal box. The roller bearing cone 58 has a spherical roller raceway 60. A pair of outer race rings 62 are provided, having spherical raceways 64. The race rings 62 are assembled within a retainer 66. The two courses of rollers 68 are concave to fit the spherical raceways and the outer ends of the rollers are of smaller diameter than the inner ends. The inner larger ends of the rollers are of frusto-conical shape, and are adapted to abut each other in the assembled position, as indicated at 70, thereby effectively holding each other in the proper endwise running position. The roller cage 72 is provided with inwardly directed portions 74 which run in close proximity to the spherical surface 60 of the bearing cone 58 and the cage is thereby guided to run concentrically. The fingers 76 of the cage separate the rollers in each course.

In Figures 1 and 3 the roller bearing assembly is mounted directly on and fixedly secured to the journal bearing 28 of the axle by press fitting the inner cone 58 thereon but the bearing portion 78 of the journal box which extends from 80 to 82 is separated from the retainer ring 66 of the roller bearing assembly by anti-friction insulation material 84 overlapping the ends of bearing area 78 and flanged at its sides as at 86 over the edges of the retainer ring. It will be noted that the distance between the flanges 38 and 56 in Figure 1 is somewhat greater than the width of the roller bearing assembly including the insulation material 84. Therefore, the wheel and axle assembly together with the roller bearing assembly is free to float in and out of the journal box to the extent of this clearance, thus providing for normal lateral movement.

In Figure 2 the bearing portion 78 of the journal box rests directly upon the retainer ring 66 of the roller bearing assembly. The roller bearing cone 58 is separated from the journal bearing 28 of the axle by a pair of anti-friction insulating sleeves 88 having flanged ends 90 overlapping the ends of the cone 58. The roller bearing assembly is normally fixedly held in place by a nut 92 threaded to the end 30 of the axle and pressing a washer 94 against the flange 90 of the outer sleeve 88 and the flange 90 of the inner sleeve is pressed against the deflector ring 96. The nut 92 is locked in position by a cotter pin 98.

In both forms of the structure disclosed, insulation either between the roller bearing and the journal box, as in Figure 1, or between the roller bearing and axle, as in Figure 2, prevents the passage of electrical current through the rollers at the contacting surfaces of these rollers with the cups and cones of the bearings. Furthermore the insulation material is preferably also of an anti-friction nature. In case of failure of the roller bearing, in Figure 1 the bearing assembly may rotate with the axle and the anti-friction insulation 84 becomes an emergency bearing. Similarly in Figure 2 the sleeves 88 constitute an emergency bearing in case of failure of the roller bearing assembly.

It is to be understood that we do not wish to be limited to the exact embodiment of the device shown, which is merely by way of illustration and not limitation, as various other forms of the device will of course be apparent to those skilled in the art without departing from the spirit of the invention as ascertained from the scope of the appended claims.

We claim:

1. In a wheel and axle assembly, the combination of a rotatable wheeled axle, a journal box, said axle having a bearing portion extending into said journal box, a roller bearing assembly fixed to said bearing portion, means providing for limited relative movement of translation between said axle and journal box, and insulating means between said axle and journal box, said means having anti-friction properties serving as a friction bearing between said axle and journal box in case of failure of said roller bearing assembly.

2. In a wheel and axle assembly, the combination of a rotatable wheeled axle, a journal box, said axle having a bearing portion extending into said journal box, a roller bearing assembly fixed to said bearing portion, means providing for limited relative movement of translation between said axle and journal box, said roller bearing assembly being so constructed and arranged to provide for self-alignment irrespective of relative angular movement of said axle and journal box, and insulating means between said axle and journal box, said means having anti-friction properties serving as a friction bearing between said axle and journal box in case of failure of said roller bearing assembly.

3. In a bearing assembly, the combination of an axle, a journal housing having an apertured closure member, said aperture being defined by an inwardly and axially disposed flange, said flange terminating in a radially disposed portion forming a lubricant channel between the same and said closure member, said axle having a bearing portion extending into said journal housing through said aperture, a roller bearing assembly disposed between said axle and journal housing and including a race member fixed to said bearing portion in spaced relation to said flange, and a collar fixed to said axle in abutting relation to said race member and having a part overlapping said lubricant channel to provide a lubricant seal for said journal housing.

4. In a bearing assembly, the combination of an axle, a journal housing having an apertured closure member, said member having an outwardly and axially disposed flange and said aperture being defined by an inwardly and axially disposed flange, said axle having a bearing portion extending into said journal housing through said aperture, a roller bearing assembly disposed between said axle and journal housing and including a race member fixed to said bearing portion in spaced relation to one of said flanges, and spaced collars mounted on said axle, one of said collars being overlapped by said outwardly disposed flange and the other of said collars being disposed in abutting relation to said race member and having a part overlapping said inwardly disposed flange, said flanges and collars providing a lubricant seal for said journal housing.

5. In a bearing assembly, the combination of an axle, a journal housing having a flange serving as a stop and an oppositely disposed apertured closure member, said closure member having spaced inwardly and axially disposed flanges, one of said flanges being adjacent to and defining said aperture and the other of said flanges being oppositely disposed in respect to the stop flange of said journal housing and serving as a stop, said axle having a bearing portion extending into said journal housing through said aperture and being provided with a shoulder, a roller bearing assembly disposed between said axle and journal housing, said assembly including a race member disposed between said stop flanges to permit limited movement of said assembly and a race member fixed to said bearing portion in spaced relation to said shoulder, and a collar fixed to said axle in abutting relation to said race member and shoulder and having a part overlapping said flange adjacent said aperture to provide a lubricant seal for said journal housing.

6. In a bearing assembly, the combination of an axle, a journal housing having a flange serving as a stop and an oppositely disposed apertured closure member, said closure member having an outwardly and axially disposed flange and spaced inwardly and axially disposed flanges, one of said last-named flanges being adjacent to and defining said aperture and the other of said flanges being oppositely disposed in respect to the stop flange of said journal housing and serving as a stop, said axle having a bearing portion extending into said journal housing through said aperture and being provided with spaced shoulders, a roller bearing assembly disposed between said axle and journal housing, said assembly including a race member disposed between said stop flanges to permit limited movement of said assembly and a race member fixed to said bearing portion in spaced relation to one of said shoulders, and spaced collars mounted on said axle and abutting said shoulders, one of said collars being overlapped by said outwardly disposed flange and the other of said collars being disposed in abutting relation to said last-named race member and having a part overlapping said inwardly disposed flange, said flanges and collars providing a lubricant seal for said journal housing.

7. In a wheel and axle assembly, the combination of a rotatable wheeled axle, a journal box, said axle having a bearing portion extending into said journal box, a roller bearing assembly disposed between said axle and journal box and comprising a race member fixed on said axle and a race member disposed in supporting relation to said journal box, means providing for limited relative movement of translation between said axle and journal box, and an insulating member associated with one of said race members to provide insulation between said axle and journal box, said member having anti-friction properties serving as a friction bearing between said axle and journal box in case of failure of said roller bearing assembly.

8. In a wheel and axle assembly, the combination of a rotatable wheeled axle, a journal box, said axle having a bearing portion extending into said journal box, a roller bearing assembly disposed between said axle and journal box and comprising a race member fixed on said axle and a race member disposed in supporting relation to said journal box, means providing for limited relative movement of translation between said axle and journal box, said roller bearing assembly being so constructed and arranged to provide for self-alignment irrespective of relative angular movement of said axle and journal box, and an insulating member associated with one of said race members to provide insulation between said axle and journal box, said member having anti-friction properties serving as a friction bearing between said axle and journal box in case of failure of said roller bearing assembly.

9. In a wheel and axle assembly, the combination of a rotatable wheeled axle, a journal box, said axle having a bearing portion extending into said journal box, a roller bearing assembly disposed between said axle and journal box and comprising a race member fixed on said axle and a race member disposed in supporting relation to said journal box, means providing for limited relative movement of translation between said axle and journal box, and insulating means associated with one of said race members, said means comprising axially and radially disposed portions embracing said member to provide complete insulation between said axle and journal box, said insulating means having anti-friction properties serving as a friction bearing between said axle and journal box in case of failure of said roller bearing assembly.

10. In a wheel and axle assembly, the combination of a rotatable wheeled axle, a journal box, said axle having a bearing portion extending into said journal box, a roller bearing assembly disposed between said axle and journal box and comprising a race member fixed on said axle and a race member disposed in supporting relation to said journal box, spaced stops on said journal box cooperating with the outer of said race members to permit limited relative movement of translation between said axle and journal box, and an insulating member disposed between said outer race member and journal box to provide insulation between said axle and journal box, said insulating member serving as a friction bearing during said relative movement of translation and in case of failure of said roller bearing assembly.

11. In a wheel and axle assembly, the combination of a rotatable wheeled axle, a journal box, said axle having a bearing portion extending into said journal box, a roller bearing assembly disposed between said axle and journal box and comprising a race member fixed on said axle and a race member disposed in supporting relation to said journal box, spaced stops on said journal box cooperating with the outer of said race members to permit limited relative movement of translation between said axle and journal box, an insulating member disposed between said outer race member and journal box to provide insulation between said axle and journal box, said insulating member serving as a friction bearing during said relative movement of translation and in case of failure of said roller bearing assembly, and means for preventing rotation of said insulating member relative to said journal box.

12. In a wheel and axle assembly, the combination of a rotatable wheeled axle, a journal box, said axle having a bearing portion extending into said journal box, a roller bearing assembly disposed between said axle and journal box and comprising a race member fixed on said axle and a race member disposed in supporting relation to said journal box, spaced stops on said journal box cooperating with the outer of said race members to permit limited relative movement of translation between said axle and journal box, and an insulating member disposed between said outer race member and journal box and having radially disposed portions disposed between said race member and said stops to provide insulation between said axle and journal box, said insulating member serving as a friction bearing during said relative movement of translation and in case of failure of said roller bearing assembly.

13. In a wheel and axle assembly, the combination of a rotatable wheeled axle, a journal box, said axle having a bearing portion extending into said journal box, a roller bearing assembly disposed between said axle and journal box and comprising a race member fixed on said axle and a race member disposed in supporting relation to said journal box, spaced stops on said journal box cooperating with the outer of said race members to permit limited relative movement of translation between said axle and journal box, an insulating member disposed between said outer race member and journaled box and having radially disposed portions disposed between said race member and said stops to provide insulation between said axle and journal box, said insulating member serving as a friction bearing during said relative movement of translation and in case of failure of said roller bearing assembly, and means for preventing rotation of said insulating member relative to said journal box.

14. In a wheel and axle assembly, the combination of a rotatable wheeled axle, a journal box, said axle having a bearing portion extending into said journal box, a roller bearing assembly disposed between said axle and journal box and comprising an inner and an outer race member, spaced stops on said journal box cooperating with the outer race member to permit relative movement of translation between said axle and journal box, insulating sleeve members disposed between said inner race member and axle to provide insulation between said axle and journal box, and means disposed in abutting relation to said inner race member for normally fixing the same to said axle, said sleeve members serving as friction bearings in case of failure of said roller bearing.

15. In a wheel and axle assembly, the combination of a rotatable wheeled axle, a journal box, said axle being a bearing portion extending into said journal box, a roller bearing assembly disposed between said axle and journal box and comprising an inner ad an outer race member, spaced stops on said journal box cooperating with the outer race member to permit relative movement of translation between said axle and journal box, insulating sleeve members disposed between said inner race member and axle and having radially disposed portions adjacent the edges of said member, and means disposed to engage said portions for normally fixing said roller bearing assembly to said axle, said sleeve members serving as friction bearings in case of failure of said roller bearing.

16. In a wheel and axle assembly, the combination of a rotatable axle, a journal box, said axle having a bearing portion extending into said journal box, and a roller bearing assembly disposed between said axle and journal box and being normally fixed to said axle, and insulating means between said axle and journal box, said means having anti-friction properties and being constructed and arranged to serve as a friction bearing between said axle and journal box in case of failure of said roller bearing assembly.

ALFRED H. OELKERS.
FRED E. BACHMAN.

CERTIFICATE OF CORRECTION.

Patent No. 2,054,228.  September 15, 1936

ALFRED H. OELKERS, ET AL.

It is hereby certified that error appears in the printed specification of the above numbered patent requiring correction as follows: Page 3, second column, line 54, claim 13, for the word "journaled" read journal; page 4, first column, line 7, claim 15, for "being" read having; line 10, same claim, for "ad" read and; and that the said Letters Patent should be read with these corrections therein that the same may conform to the record of the case in the Patent Office.

Signed and sealed this 1st day of December, A. D. 1936.

(Seal)

Henry Van Arsdale
Acting Commissioner of Patents.

race member for normally fixing the same to said axle, said sleeve members serving as friction bearings in case of failure of said roller bearing.

15. In a wheel and axle assembly, the combination of a rotatable wheeled axle, a journal box, said axle being a bearing portion extending into said journal box, a roller bearing assembly disposed between said axle and journal box and comprising an inner ad an outer race member, spaced stops on said journal box cooperating with the outer race member to permit relative movement of translation between said axle and journal box, insulating sleeve members disposed between said inner race member and axle and having radially disposed portions adjacent the edges of said member, and means disposed to engage said portions for normally fixing said roller bearing assembly to said axle, said sleeve members serving as friction bearings in case of failure of said roller bearing.

16. In a wheel and axle assembly, the combination of a rotatable axle, a journal box, said axle having a bearing portion extending into said journal box, and a roller bearing assembly disposed between said axle and journal box and being normally fixed to said axle, and insulating means between said axle and journal box, said means having anti-friction properties and being constructed and arranged to serve as a friction bearing between said axle and journal box in case of failure of said roller bearing assembly.

ALFRED H. OELKERS.
FRED E. BACHMAN.

CERTIFICATE OF CORRECTION.

Patent No. 2,054,228. September 15, 1936

ALFRED H. OELKERS, ET AL.

It is hereby certified that error appears in the printed specification of the above numbered patent requiring correction as follows: Page 3, second column, line 54, claim 13, for the word "journaled" read journal; page 4, first column, line 7, claim 15, for "being" read having; line 10, same claim, for "ad" read and; and that the said Letters Patent should be read with these corrections therein that the same may conform to the record of the case in the Patent Office.

Signed and sealed this 1st day of December, A. D. 1936.

(Seal)

Henry Van Arsdale
Acting Commissioner of Patents.

CERTIFICATE OF CORRECTION.

Patent No. 2,054,228.                                              September 15, 1936

ALFRED H. OELKERS, ET AL.

It is hereby certified that error appears in the printed specification of the above numbered patent requiring correction as follows: Page 3, second column, line 54, claim 13, for the word "journaled" read journal; page 4, first column, line 7, claim 15, for "being" read having; line 10, same claim, for "ad" read and; and that the said Letters Patent should be read with these corrections therein that the same may conform to the record of the case in the Patent Office.

Signed and sealed this 1st day of December, A. D. 1936.

(Seal)
                                              Henry Van Arsdale
                                   Acting Commissioner of Patents.